United States Patent [19]

Magnus et al.

[11] Patent Number: 4,943,649

[45] Date of Patent: Jul. 24, 1990

[54] POLYOLS, USE AND METHOD OF PREPARATION

[75] Inventors: George Magnus, Arlington Heights; Brian Kelley, Round Lake Beach, both of Ill.

[73] Assignee: Polylactane, Inc., Milwaukee, Wis.

[21] Appl. No.: 266,471

[22] Filed: Nov. 1, 1988

[51] Int. Cl.$^5$ ............ C07H 3/10; C08B 11/145; C08B 11/155; C08G 18/12

[52] U.S. Cl. .................... 536/124; 536/1.1; 536/126; 521/163; 521/167

[58] Field of Search ............... 536/1.1, 124, 126; 521/163, 167

[56] References Cited

U.S. PATENT DOCUMENTS

| | | | |
|---|---|---|---|
| 3,420,787 | 1/1969 | Reymore | 521/167 |
| 3,629,162 | 12/1971 | Richardson et al. | 521/153 |
| 3,658,731 | 4/1972 | Richardson et al. | 521/102 |
| 3,717,597 | 2/1973 | Hesskamp | 521/54 |
| 4,154,931 | 5/1979 | Richter | 540/492 |
| 4,305,858 | 12/1981 | Reischl | 521/163 |
| 4,310,448 | 1/1982 | Reischl | 521/163 |
| 4,459,397 | 7/1984 | Richardson et al. | 527/300 |
| 4,569,952 | 2/1986 | Radovich et al. | 521/167 |
| 4,714,717 | 12/1987 | Londrigan et al. | 521/131 |
| 4,795,763 | 1/1989 | Gluck et al. | 521/99 |

FOREIGN PATENT DOCUMENTS 0269271 6/1988 European Pat. Off. .

*Primary Examiner*—Merrell C. Cashion, Jr.
*Assistant Examiner*—Carlos Azpuru
*Attorney, Agent, or Firm*—Quarles & Brady

[57] ABSTRACT

Alkoxylated polyols are prepared by dispersing a nitrogen-containing material, such as urea, into a dispersing media comprised of a polyether or polyester polyol and a chemical moiety capable of being alkoxylated, such as a carbohydrate, i.e. whey permeate or sucrose, lactose, etc., and reacting the resultant dispersion with a $C_2$-$C_6$ epoxide to form an alkoxylated polyol having a hydroxyl number below about 600. In certain embodiments, up to about 25% by weight of a urea material can be incorporated within the alkoxylated polyol for improved flame retardancy in the polyurethane/polyisocyanate/polyisocyanurate foams produced therefrom.

30 Claims, No Drawings

POLYOLS, USE AND METHOD OF PREPARATION

TECHNICAL FIELD

The present invention relates to improved polyether and polyester polyols for use in the manufacture of flame-retardent, polyurethane polymers.

BACKGROUND OF THE PRIOR ART

Polyurethane polymers are conventionally prepared by the reaction of an organic polyol, such as a polyether or polyester polyol, with a polyisocyanate. The rate of the reaction is controlled by adding catalysts such as triethylamine, triethylene diamine or other amine catalysts. Other optional ingredients in the foam formulation include blowing agent(s), surfactant(s) and flame retardant(s).

Rigid polyurethane foams can be made of polyether polyols that are prepared using sucrose, sorbitol and methylglucoside. Sucrose is the preferred sugar for this purpose because of its availability and low cost.

The milk sugar, lactose, has also been shown to be usable in making polyurethane foams. Whey powder, containing lactose as the polyhydroxy compound, in DMSO, has been used in conjunction with polyisocyanate, catalyst and blowing agent to make polyurethane foams, Richardson et al. U.S. Pat. No. 3,658,731. The foams, however, have highly opened cell structures and low compressive strength.

The DMSO can be omitted from the formula when the whey substitution is limited to about 80% (preferably in the range of 50–60%)—the remaining being a conventional sucrose-based polyol, Richardson et al. U.S. Pat. No. 3,629,162. However, the properties of the product are inferior to the foams prepared from formulations using no lactose additives. In addition, polyol formulations using insoluble lactose additives are highly susceptible to settling and abrasive to mixing head, pumps and pressure regulating valves of dispensing equipments.

The substitution of lactose for sucrose in propoxylation reactions leads to side reactions as the result of the action of the required base and heat on lactose. These side reactions result in dark polyol preparations. The crude lactose-based polyol preparations are high in carbonyl content—a feature that was made use of in the covalent incorporation of urea in the polyol preparation by heating the two ingredients together. The polyurethane foams prepared using urea-modified polyethers exhibit improved flame-retardant qualities over conventional sucrose based foams, Richardson et al. U.S. Pat. No. 4,459,397.

Other patents suggest that urea be mixed mechanically with polyurethane foams to produce self-extinguishing foams. For example, the Hesskamp, U.S. Pat. No. 3,717,597 discloses a self-extinguishing composite material including bits of polyurethane foam mechanically mixed with urea and bound together to form a self-extinguishing composite material.

Difficulties have been encountered when attempts have been made to incorporate solid urea in conventional polyols prior to mixing with isocyanate to form the polyurethane polymer. The dispersed granular urea in the liquid polyol leads to abrasion and increased wear of pumps, pipes and nozzles used to dispense the material. The Reymore, et al. U.S. Pat. No. 3,420,787 and Richter, et al. U.S. Pat. No. 4,154,931 disclose methods of incorporating substituted ureas and cyclic ureas as extenders in polyurethane formulations for making polyurethane foams having improved flame retardancy.

It obviously would be desirable to have improved polyols which contain high concentrations of urea from which to make polyurethane foams of superior flame retardancy.

SUMMARY OF THE INVENTION

The present invention relates generally to improved polyols containing a high concentration of dissolved urea for use in the manufacture of polyurethane polymers, having superior flame retardancy.

It is an object of the invention to disclose a method of preparing novel improved polyols which contain up to about 15% by weight of dissolved urea.

Another object is to provide a method of preparing an improved fire-resistant polyurethane foam from the polyols.

The inventive method basically consists dissolving urea in a solvent system which comprises a liquid, propoxylated, polyether or polyester polyol and a sugar, such as sucrose or lactose; reacting the resulting solution with an epoxide, such as propylene oxide, in the presence of alkali and a temperature of about 100° C. to about 125° C. to obtain a polyol having a hydroxyl number of about 470 to about 520 and in which some of the nitrogen present is in the form of tertiary nitrogen. The alkoxylated polyol can be used as such or cooled additional urea added and, then heated at about 100–120° C. for about 2 to about 5 hours with venting of ammonia to obtain a polyol containing from about 5% up to about 15% of urea which can be used to prepare polyurethane polymers with improved flame retardancy.

The novel polyols of the present invention can be used for the same purposes as prior art polyether polyols, but they contain much higher percentages of dissolved urea than could be obtained by prior art methods. The novel polyols have lower viscosities and are different chemically from prior art polyols. The lower viscosities suggest that significant fragmentation of carbohydrates may be taking place, but they also might be due to the fact that some (e.g. about 30 to above 75%) of the nitrogen present is in the tertiary form.

The method of the present invention differs importantly from prior art methods in that it employs an effective amount of propoxylated polyether polyol or polyester polyol as the solvent for mono or dissaccharides prior to the alkoxylation step. The addition of urea to the initial mixture is also different from the prior art and appears to help solubilize the post addition of urea to the alkoxylated polyol. The method also differs in that ammonia is vented once a desired degree of alkoxylation is achieved to prevent the formation of urea/ammonia complexes.

DESCRIPTION OF PREFERRED EMBODIMENT

In the preferred embodiment of the invention, the urea solvent system is a mixture of about equal parts by weight of a propoxylated sucrose polyether or polyester polyol, and lactose or a whey permeate. About one-half of the desired amount of urea is dissolved in the polyol-sugar solvent system and reacted with an epoxide, such as propylene oxide, at a temperature of about 80° C. to about 130° C. in the presence of an alkali, such as KOH, for 2 to 3 hours in an airtight stirred reaction vessel under pressure until a propoxylated polyol product is obtained which has nitrogen present in the tertiary form and a hydroxyl number of about 470 to about 520. The alkoxylated polyol is cooled, the remainder of the urea added and the mixture heated with venting of ammonia at a temperature of about 100° C. to 120° C. until the reaction is complete. The novel polyols thus obtained have a urea to lactose ratio of about 1.3–1.5 to 1 and a urea to alkoxylated polyol ratio of about 0.18.

The sugars that can be used in the inventive method, in addition to lactose and lactose containing sources, include other sugars, such as sucrose, maltose, glucose, galactose and sources and mixtures thereof.

The preferred propoxylated polyol used as the solvent for the urea is a sucrose polyether polyol, such as that available from Stepan Company, Northfield, IL under the name Stepanpol PE-3703. A preferred polyester polyol is diethlyene glycol phthalate polyester polyol which is available as Stepanpol PS-3152. Other polyols that might be used include lactose polyols and phthalic glycols.

In addition to the described ingredients, the reaction mixture may contain a small amount of a glycol to enhance urea holding; antimony oxide or another known flame-resistant; and/or gluconic or citric acid to add binding sites on urea.

The novel polyols obtained by practice of the inventive method may be reacted with a polyisocyanate, such as polyphenylmethylele polyisocyanate available commercially under such trade names as PAPI, MONDUR, RUBINATE and LUPRANATE, and a commercially available amine catalyst, such as (DABCO 8020), to prepare an improved one-shot, rigid polyurethane foam of superior flame retardancy. A foaming agent or blowing agent, such as $CCl_3F$, with a silicone surfactant can be used to affect cell structure. The foams can be made with or without additional flame retardants. The general procedures for making the polyurethanes and the concentrations of ingredients that may be used are those described in U.S. Pat. No. 4,459,397. Other conventional methods can also be used to prepare polyurethanes using the improved polyether polyols of the present invention.

The practice of the invention is further illustrated by the following examples.

EXAMPLE 1

Preparation of Propoxylated Polyether Polyol

To a five gallon Chemineer pressure reactor the following ingredients were charged: 3069.6 grams of whey permeate, 3069.3 grams of Stepanpol PE-3708, 1773.2 grams of urea, and 47.9 grams of potassium hydroxide. The reactor was heated with agitation and a nitrogen blanket to between 110° C. and 120° C. Propylene oxide (10,120 grams) was added to the heated reactor at a rate which maintained the pressure between 65–80 psig. This material had a hydroxyl number of 659. More propylene oxide was added and reacted to constant pressure to bring the hydroxyl number down to 408.

EXAMPLE 1A

Urea Treatment of Propoxylated Polyether Polyol

To a liter, four-neck, round bottom flask equipped with: stirrer, thermometer, and a nitrogen inlet tube, there was charged 500 grams of the propoxylate of Example 1. This material was heated to 110° C. with a nitrogen flow of 105 ml/min. and constant agitation. At 110° C., 102.7 grams of 50% urea in water was added and reacted at 110° C. for one hour after which a vacuum of 30 inches of Hg was pulled to remove the water. The hydroxyl number of the polyol was 439.4, the water content was 0.20%, and the viscosity at 25° C. was 2132 cps.

EXAMPLE 2

Preparation of Propoxylated Polyether Polyol

To a five gallon Chemineer pressure reactor the following ingredients were charged: 2813.0 grams of lactose, 2838.4 grams of Stepanpol PE-3708, 1467.5 grams of urea, and 46.3 grams of potassium hydroxide. The reactor was heated with agitation and nitrogen blanket to between 110° C. and 120° C. Propylene oxide (12,180 grams) was added to the heated reactor at a rate which maintained the pressure between 65–80 psig. This material had a hydroxyl number of 551. More propylene oxide was added and reacted to constant pressure to bring the hydroxyl number down to 510.3. This material had a viscosity at 25° C. of 1330 cps and a water content of 0.07%.

EXAMPLE 2A

Urea Treatment of Propoxylated Polyether Polyol

To a twelve liter, three-neck, round bottom flask equipped with: stirrer, thermometer, and a nitrogen inlet tube, there was charged 9006 grams of the propoxylate of Example 2. This material was heated to 110° C. with a nitrogen flow of 105 ml/min. and constant agitation. At 10° C., 1849.4 grams of 50% urea in water was added and reacted at 110° C. for one hour after which a vacuum of 30 inches of Hg was pulled to remove the water. The hydroxyl number of the polyol was 530.4, the water content was 0.06% and the viscosity at 25° C. was 3770 cps.

EXAMPLE 2B

Urea Treatment of Propoxylated Polyether Polyol

To a one liter, four-neck, round bottom flask equipped with: stirrer, thermometer, and a nitrogen inlet tube, there was charged 500 grams of the propoxylate of Example 2. This material was heated to 110° C. with a nitrogen flow of 56 ml/min. and constant agitation. At 110° C., 51.34 grams of urea prills were added and reacted at 110° C. for about three hours. The hydroxyl number of the polyol was 562.8, the water content was 0.20% and the viscosity at 25° C. was 3001 cps.

EXAMPLE 3

Preparation of Propoxylated Polyester Polyol

To a one liter, four-neck round bottom flask equipped with a stirrer, thermometer, nitrogen inlet tube and condenser, the following ingredients were charged: 127.6 grams of Stepanpol PS-3152 (diethylene glycol phthalate polyester polyol), 127.6 grams of whey permeate, 74.3 grams of urea and 2.0 grams of potassium hydroxide. This material was heated to 110° C. under nitrogen and constant agitation. Propylene oxide (468.5 grams) was added dropwise to the reaction mixture which was maintained at a temperature of 105–115° C. After all the propylene oxide was added to the reactor, the mixture was reacted for an additional 2 hours at 110° C. The analysis of the product was found to be:

Hydroxyl number: 524.2
Water, %: 0.12

Viscosity, cps at 25° C.: 2088

EXAMPLE 3A

Urea Treatment of Propoxylated Polyester Polyol

To a one liter, four-neck round bottom flask equipped with: stirrer, thermometer, and a nitrogen inlet tube there was charged 407.1 grams of the propoxylate of Example 3. This material was heated to 110° C. with a nitrogen flow of 105 ml/min. and constant agitation. At 110° C., 83.6 grams of 50% urea in water was added and reacted for one hour after which a vacuum of 30 inches of Hg was pulled to remove the water. The hydroxyl number was 505.4, the water content was 0.05%, and the viscosity at 25° C. was 16,620 cps.

Analysis of the polyols of Examples 2A and 2B showed that almost 75% of the urea added initially was converted to tertiary nitrogen and that virtually none of the post-added urea was converted to tertiary nitrogen. It appears that the conversion of the urea to tertiary nitrogen contributes to the better fluidity and lower viscosity of the polyols of the present invention as compared to those of the Richardson patent (Supra).

It will be readily apparent to those skilled in the art that the description given has been for illustration only and that it is not intended to limit the invention. For example, in addition to urea, it may be possible in some instances to employ, melamine, hydrazine, dicyandiamide, guanidine, pyridine, or other compounds in place of all or part of the urea. Therefore, the term as used herein "urea" is intended to include equivalents. In addition, other alkali including ammonia quanidine can be used in place of the KOH employed in the preferred embodiment of the method. The only limitations which are to be placed on the present invention are those contained in the claims which follow.

We claim:

1. A method of producing an alkoxylated polyol comprising:
    (a) dispersing a urea reactant in a liquid dispersing media comprised of a polyether polyol, a polyester polyol and mixtures thereof and a chemical moiety capable of being alkoxylated and being characterized by at least the following characteristics:
        (1) being selected from the group consisting essentially of carbohydrates, triazines, derivatives and sources thereof and mixtures thereof;
        (2) being dispersible in said dispersing media at a temperature below about 130° C.; and
        (3) having at least two reactive hydrogen atoms therein; and
    (b) reacting the resultant dispersion with a $C_2$–$C_6$ epoxide under alkoxylation conditions for a period of time sufficient to obtain an alkoxylated polyol having a hydroxyl number below about 600.

2. A method as defined in claim 1 wherein said dispersing media includes polyols having a hydroxyl number in the range of about 50 to 1000.

3. A method as defined in claim 1 wherein said urea reactant is selected from the groups consisting of annomia, urea, thiourea, methylamine, dimethylamine, a C1–C8 primary amine, a C1–C8 secondary amine and mixtures thereof.

4. A method as defined in claim 1 wherein said chemical moiety is selected from the group consisting essentially of sugars, starches, celluloses, sources thereof, and mixtures thereof.

5. A method as defined in claim 1 wherein said sugars are selected from the groups consisting essentially of sucrose, lactose, maltose, glucose, galactose, sources thereof, and mixtures thereof.

6. An alkoxylated polyol produced in accordance with the method defined in claim 1.

7. An alkoxylated polyol produced in accordance with the method defined in claim 2.

8. An alkoxylated polyol produced in accordance with the method defined in claim 3.

9. An alkoxylated polyol produced in accordance with the method defined in claim 4.

10. An alkoxylated polyol produced in accordance with the method defined in claim 5.

11. A method of producing an alkoxylated polyol containing a urea reactant comprising:
    (a) dispersing a urea reactant in a liquid dispersing media comprised of a polyether polyol, a polyester polyol and mixtures thereof and a chemical moiety capable of being alkoxylated and being characterized by at least the following characteristics:
        (1) being selected from the groups consisting essentially of carbohydrates, triazines, derivatives thereof and mixtures thereof;
        (2) being dispersible in said dispersing media at a temperature below about 130° C.; and
        (3) having at least two reactive hydrogen atoms therein;
    (b) reacting the resultant dispersion within $C_2$–$C_6$ epoxide under alkoxylation conditions for a period of time sufficient to obtain an alkoxylated polyol having a hydroxyl number below about 600; and
    (c) adding up to about 25% by weight, based on a 100% total weight basis of said alkoxylated polyol, of a urea reactant selected from the groups consisting essentially of urea, thiourea, substituted ureas, cyclic ureas and mixtures thereof, and maintaining said reaction conditions for a period of time sufficient to incorporate at least some of said urea reactant within said alkoxylated polyol.

12. A method as defined in claim 11 wherein the amount of urea reactant added in step (c) is at least about 5% by weight, based on a 100% total weight basis of said alkoxylated polyol.

13. A method as defined in claim 11 wherein the amount of urea reactant added in step (c) is in the range of about 5% to 15% by weight, based on a 100% total weight basis of said alkoxylated polyol.

14. A method as defined in claim 11 wherein step (c) is conducted at a temperature in the range of about 80° to 130° C.

15. A method as defined in claim 11 wherein step (c) is conducted at a temperature in the range of about 110° to 120° C.

16. An alkoxylated polyol produced in accordance with claim 11.

17. An alkoxylated polyol produced in accordance with claim 12.

18. An alkoxylated polyol produced in accordance with claim 13.

19. An alkoxylated polyol produced in accordance with claim 14.

20. An alkoxylated polyol produced in accordance with claim 15.

21. An alkoxylated polyol containing at least about 30% tertiary nitrogen, based on a 100% total basis of primary secondary and tertiary nitrogen present in said polyol.

22. An alkoxylated polyol as defined in claim 21 wherein the amount of tertiary nitrogen in said polyol is about 75%.

23. A polyurethane produced by reacting an alkoxylated polyol prepared in accordance with claim 11 with a polyisocyanate under polymerization conditions.

24. An alkoxylated polyol produced in accordance with claim 11, wherein said polyol contains up to 25% by weight, based on a 100% total weight basis of said polyol, of a urea material.

25. An alkoxylated polyol produced in accordance with claim 11 wherein said polyol contains about 5% to 15% by weight, based on a 100% total weight basis of said polyol, of urea.

26. A method of producing an alkoxylated polyol containing a urea reactant comprising:
  (a) dispersing a urea reactant in a liquid dispersing media comprises of a polyether polyol, a polyester polyol and mixtures thereof and a chemical moiety capable of being alkoxylated and being characterized by at least the following characteristics:
    (1) being selected from the groups consisting essentially of carbohydrates, triazines, derivatives thereof and mixtures thereof;
    (2) being dispersible in said dispersing media at a temperature below about 130° C.; and
    (3) having at least two active hydrogen atoms therein;
  (b) reacting the resultant dispersion with a $C_2$–$C_6$ epoxide under alkoxylation conditions at a temperature in the range of about 80° to 130° C. for a period of time sufficient to obtain an alkoxylated polyol having a hydroxyl number below about 600;
  (c) cooling said alkoxylated polyol to a temperature in the range of about 10° 110° C. and adding up to about 25% by weight based on a 100% total weight basis of said alkoxylated polyol, of a urea reactant selected from the groups consisting essentially of urea, thiourea, substituted ureas, cyclic ureas and mixtures thereof; and
  (d) heating the resultant admixture at a temperature in the range of about 110° to 120° C. with venting of ammonia for a period of time sufficient to incorporate at least some of said urea material within said alkoxylated polyol.

27. A method as defined in claim 26 wherein said $C_2$–$C_6$ epoxide is selected from the group consisting essentially of ethylene oxide, propylene oxide and mixtures thereof.

28. A method as defined in claim 26 wherein the amount of said urea reactant relative to said dispersing media is in the range of about 1:4 to about 1:2.

29. A method as defined in claim 26 wherein said polyether polyol is a sucrose polyether polyol.

30. A method as defined in claim 26 wherein said polyester polyol is a diethylene glycol phthalate polyester polyol.

* * * * *